Aug. 8, 1939.  W. H. NEWELL  2,168,575
SYSTEM FOR TRANSMITTING ANGULAR MOTION
Filed Oct. 11, 1938
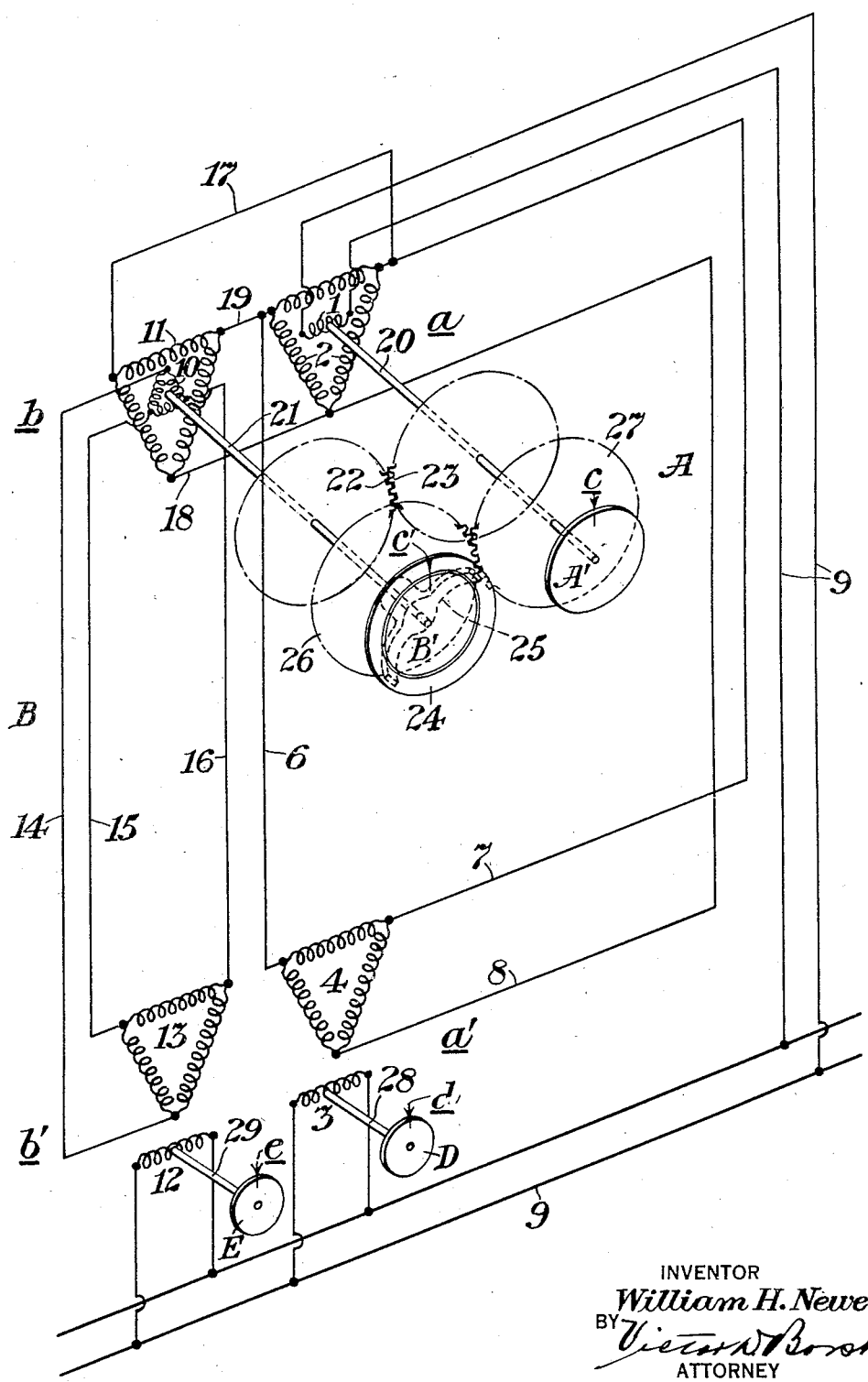
INVENTOR
*William H. Newell*
BY
ATTORNEY Patented Aug. 8, 1939

2,168,575

UNITED STATES PATENT OFFICE 2,168,575

SYSTEM FOR TRANSMITTING ANGULAR MOTION

William H. Newell, Bronx, N. Y., assignor to Ford Instrument Company, Inc., Long Island City, N. Y., a corporation of New York Application October 11, 1938, Serial No. 234,406

5 Claims. (Cl. 172—239)

This invention relates to a system for transmitting angular movement and more particularly to a system utilizing a dual motion transmission at different ratios with respect to the angular movement to be transmitted.

In the transmission of angular motion, it is common practice to utilize two self-synchronous systems. One of such systems is actuated in a one to one ratio with the angular motion to be transmitted and the other is operated in a higher ratio with respect to the angular motion to be transmitted. In such systems as have heretofore been used, the rotors of the transmitters are mechanically geared together in the desired ratio and each transmitter is electrically connected to a receiver so that the rotor of the receiver reproduces the angular movement of the rotor of the transmitter to which it is connected.

For the transmission of angular movement in which the ratio between the movement of the rotors of the transmitters is low such systems have been found to be satisfactory. When, however, the ratio between the movement of the rotors of the transmitters is relatively high, such for example, as one hundred to one, an undesirable gear train must be utilized.

The invention herein disclosed has for an object to provide an improved system of the type referred to for obtaining high ratios without the large mechanical gear reduction commonly used. The object of the invention is accomplished by the combination of two self-synchronous transmission systems, one comprising a transmitter and the other a transformer and each including a receiver. The stator of the transmitter and the stator of the transformer are connected together electrically and the rotors thereof are mechanically connected. The connection is such that the rotor of the transformer operates at a different angular movement from the rotating field effected by the electrical connection with the transmitter. In consequence, while the receiver connected to the transmitter follows the movement of the transmitter, the receiver connected to the transformer operates in accordance with the difference between the rotating electrical field and the mechanical rotation of the rotor.

A system of this type, embodying the invention is illustrated, diagrammatically, in the single figure that constitutes the accompanying drawing. The units used in the system are well known in the art and shall not, therefore, be described in detail.

In the drawing A and B denote two self-synchronous transmission systems constituting a coarse and fine control.

The system A has a transmitter $a$ and a receiver $a'$. A rotor 1 and a stator 2 constitute the transmitter $a$, and a rotor 3 and a stator 4 constitute the receiver $a'$. Like points of the stator windings 2 and 4 of the transmitter $a$ and the receiver $a'$ are interconnected by conductors 6, 7 and 8. The rotors 1 and 3 of the transmitter $a$ and the receiver $a'$ are energized from a source of alternating current supply 9.

The system B has a transformer $b$ and a receiver $b'$. A rotor 10 and a stator 11 constitute the transformer $b$, and a rotor 12 and a stator 13 constitute the receiver $b'$. The winding of the rotor 10 of the transformer $b$, and the winding of the stator 13 of the receiver $b'$ are interconnected by conductors 14, 15 and 16 respectively. The rotor 12 of the receiver $b'$ is energized from supply lines 9.

The system A is connected electrically to that of the system B by conductors 17, 18 and 19 which respectively interconnect opposite points of the windings of the stators 2 and 11 of the transmitter $a$ and the transformer $b$. Due to this electrical connection between these systems, the rotating electrical fields induced in the stator 2 and set up in the stator 11, will rotate together and at the same speed.

The system A is connected mechanically to the system B as follows: the transmitter and transformer rotors 1 and 10 of these systems have shafts 20 and 21 respectively, which are connected together by means of reduction gears 22 and 23 fixedly mounted thereon. For the purpose of operating the transmitter, a hand-wheel 24 is secured to the outer ends of oppositely extending arms of a bracket 25 having a central hub which is rotatably mounted on the shaft 21. To the hub of bracket 25 is secured a gear 26 which meshes in a one to one ratio with a gear 27 fixedly mounted on the shaft 20. The hand-wheel 24, bracket 25, and gear 26, rotate together and are freely rotatable on the shaft 21. Therefore, when the hand-wheel 24 is turned, rotor 1 of transmitter $a$ will rotate by means of gears 26, 27 and shaft 20. Rotor 10 of transformer $b$ will simultaneously be rotated through the medium of gears 23, 22 and the shaft 21. Since the rotor shafts rotate in opposite directions it will be noted that the windings of their stators are so connected and arranged that the rotating electrical fields set up therein will rotate in the same direction as the shafts.

For the purpose of indicating the angular movement transmitted, dials A' and B' are mounted on the outer ends of the rotor shafts 20 and 21. A fixed reference point or indicator for the dial A' is indicated at c, and another such indicator c' for the dial B' is located on the hand-wheel 24 and rotates therewith. For the same purpose, corresponding fixed reference points, or indicators, are indicated at d and e for dials D and E, which are mounted on the ends of shafts 28 and 29 respectively, of the receiving rotors 3 and 12.

The operation of the apparatus illustrated and described above is briefly as follows: suppose for example, it is desired to have a one hundred to one ratio exist between the outputs of the receivers a' and b'. Then the gear 22 would require 100 teeth corresponding to 99 teeth for the gear 23. Under these conditions, gear 22 makes one less revolution than gear 23 makes for every 100 revolutions of gear 23, or in other words, for every complete turn of gear 23, gear 22 makes one one hundredth of a revolution less than that of the gear 23. The rotating electrical field set up in the stator of the transformer b rotates at the same speed as the rotor 2 of the transmitter a is rotated. Then the rotor 10 will be rotated mechanically one one hundredth of a turn per revolution less than the field is rotated electrically. The resulting electrical ratio between the outputs of the transmitter a and the transformer b will be one hundred to one.

From the foregoing description it will be understood that any other ratios between the electrical outputs of the transmitter a and the transformer b can be obtained by this system depending upon the gear ratio existing between the transmitter and transformer rotors.

While a preferred embodiment of the invention has been shown and described, it will be understood that the invention may be embodied in other forms and that various changes may be made in structural details without departing from its principles as defined in the appended claims.

I claim:

1. A self-synchronous system for transmitting angular movement at different ratios comprising a transmitter and a transformer, each including a rotor and a stator, means for effecting a difference between the electrical outputs of said transmitter and said transformer comprising an electrical connection between the stators and a mechanical connection between the rotors thereof, and a pair of receivers, conductors connecting the transmitter and one receiver and the rotor of the transformer and the other receiver.

2. A self-synchronous system for transmitting angular movement at different ratios comprising a transmitter and a transformer, each including a rotor and a stator, means for effecting a difference between the electrical outputs of said transmitter and said transformer comprising an electrical connection between the stators and a mechanical connection between the rotors thereof wherein the rotors revolve at different speeds, a pair of receivers, and conductors connecting the transmitter and one receiver and the rotor of the transformer and the other receiver.

3. A self-synchronous system for transmitting angular movement at different ratios comprising a transmitter and a transformer, each including a rotor and a stator, means for effecting a difference between the electrical outputs of said transmitter and said transformer comprising an electrical connection between the stators and a mechanical connection between the rotors thereof wherein one of the rotors makes one less revolution than the other for a given number of revolutions of the other, a pair of receivers, and conductors connecting the transmitter and one receiver and the rotor of the transformer and the other receiver.

4. A self-synchronous system for transmitting angular movement at different ratios comprising in combination a transmitter including a stator and a rotor, a transformer including a stator and a rotor, electrical connections between the stator of the transmitter and the stator of the transformer, a mechanical connection between the rotor of the transmitter and the rotor of the transformer including reduction gears and a pair of receivers each including a stator and a rotor, electrical connections between the stator of the transmitter and the stator of one receiver and electrical connections between the rotor of the transformer and the stator of the other receiver.

5. A self-synchronous system for transmitting angular movement at different ratios comprising a transmitter including a rotor and a stator, a transformer including a primary element and a secondary element, one of which is rotatable, means for effecting a difference between the electrical outputs of said transmitter and said transformer comprising an electrical connection between the output of the transmitter and the primary of the transformer and a mechanical connection between the rotor of the transmitter and the rotatable element of the transformer, a pair of receivers, and conductors connecting the output of the transmitter to one receiver and the secondary element of the transformer to the other receiver.

WILLIAM H. NEWELL.